United States Patent
Shay et al.

(10) Patent No.: US 8,482,340 B2
(45) Date of Patent: Jul. 9, 2013

(54) MASTER-SLAVE LOW-NOISE CHARGE PUMP CIRCUIT AND METHOD

(75) Inventors: Michael J. Shay, Fairview, TX (US); Vadim V. Ivanov, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 80 days.

(21) Appl. No.: 13/373,117

(22) Filed: Nov. 4, 2011

(65) Prior Publication Data

US 2013/0113546 A1   May 9, 2013

(51) Int. Cl.
*G05F 1/10* (2006.01)

(52) U.S. Cl.
USPC .......................................................... 327/536

(58) Field of Classification Search
USPC .......................................... 327/535, 536, 537
See application file for complete search history.

(56) References Cited

U.S. PATENT DOCUMENTS

| | | | | |
|---|---|---|---|---|
| 6,229,385 | B1 * | 5/2001 | Bell et al. ...................... | 327/565 |
| 6,661,278 | B1 | 12/2003 | Gilliland ........................ | 327/536 |
| 7,554,386 | B2 * | 6/2009 | Kwon et al. ................... | 327/536 |
| 7,579,902 | B2 * | 8/2009 | Frulio et al. .................. | 327/536 |
| 7,969,231 | B2 * | 6/2011 | Yamahira ...................... | 327/536 |
| 8,344,791 | B2 * | 1/2013 | Adkins et al. ................. | 327/536 |

OTHER PUBLICATIONS

"History of the High-Voltage Charge Pump", Chapter 1 of the book "Charge Pump Circuit Design" by Feng Pan and Tapan Samaddar, McGraw-Hill Companies, Inc., ISBN 0-07-147045-X, Copyright 2006, pp. 1-10.
"A Linear High Voltage Charge Pump for MEMS Applications in 0.18/μm CMOS Technology" by Innocent et al., IMEC, 4 pages.
"Power Efficient Charge Pump in Deep Submicron Standard CMOS Technology" by Pelliconi et al., ST Microelectronics—Central R&D—4 pages.

* cited by examiner

*Primary Examiner* — Jeffrey Zweizig
(74) *Attorney, Agent, or Firm* — Alan A. R. Cooper; Wade J. Brady III; Frederick J. Telecky, Jr.

(57) ABSTRACT

Charge pump circuitry (1) includes a master charge pump (2) including a voltage multiplier (5) and charge pump (30) which operate to produce a boosted, unregulated voltage (Vunreg), and also includes a slave charge pump (3) including a voltage multiplier (36) and charge pump (50) which operate to produce a boosted control voltage (Vctl) which then is filtered. The boosted, unregulated voltage (Vunreg) is regulated in response to the filtered, boosted control voltage (Vctl) to produce a boosted, regulated, low-noise voltage (Vreg). The boosted control voltage (Vctl), relative to a reference voltage (Vref_SH), is controlled by feedback circuitry (61, 62, 65) in response to the boosted, regulated, low-noise voltage (Vreg).

20 Claims, 3 Drawing Sheets

MASTER-SLAVE LOW-NOISE CHARGE PUMP CIRCUIT AND METHOD

BACKGROUND OF THE INVENTION

The present invention relates generally to charge pump circuits, and more particularly to low noise, high multiplication factor charge pump circuits.

"High multiplication factor" bias voltage generation in an integrated circuit is needed in many power-sensitive and cost-sensitive applications, including size-constrained systems for which large external components, such as inductors in various voltage boosting circuits, are prohibitive. Bias voltage generation circuitry for communication systems must be designed to meet stringent limitations on the generation and coupling of spurious RF noise levels into the RF components of the system. Also, high voltage multiplication or multiplier circuitry with very low spurious noise content within standard RF (radio frequency) communication frequency bands is needed to generate bias voltages and drive voltages for various applications, for example, to drive MEMS (microelectromechanical systems) actuators in an RF-MEMS varactor array product. It often is critical that such high-voltage multiplication circuitry meet very stringent limits on generation of spurious and/or load-sensitive noise generation and levels of noise energy within the standard RF communication bands.

Known high voltage multiplication charge pump circuits usually rely on a single high voltage pump in which the regulation of output voltage provided to a load is derived from a voltage generated by the single high voltage charge pump. If control of the voltage regulation is derived from the same charge pump that drives a variable load, there may be much greater load-dependent noise content and spurious noise content than is suitable for many RF applications. (The output ripple voltage, as further filtered and used for output regulation, is a primary influence in the generation of the spurious noise generated by a charge pump. Also, low power consumption is an important consideration in the design of integrated circuits for applications in the so-called "mobile product marker".)

Thus, there is an unmet need for a low noise, high voltage multiplication charge pump circuit and method.

There also is an unmet need for a low noise, high-voltage-multiplication charge pump circuit and method which provide precise regulation of an output voltage supplied to a load and which generate very low levels of spurious RF noise and noise energy.

There also is an unmet need for a low noise, high-voltage-multiplication charge pump circuit and method which provide precise regulation of an output voltage supplied to a load and which generate very low levels of load-dependent noise.

There also is an unmet need for a low noise, high-voltage-multiplication charge pump circuit and method which provide precise regulation of an output voltage supplied to a load and which generate very low spurious RF noise levels and energy which does not rely on feedback from the output circuitry of that charge pump circuit to provide the precise regulation of the output voltage.

There also is an unmet need for a low noise, high-voltage-multiplication charge pump circuit and method which provide precise regulation of an output voltage supplied to a load, which generate very low levels of spurious RF noise and noise energy, and which consume relatively little power.

SUMMARY OF THE INVENTION

It is an object of the invention to provide a low noise, high-voltage-multiplication charge pump circuit and method.

It is another object of the invention to provide a low noise, high-voltage-multiplication charge pump circuit and method which provide precise regulation of an output voltage supplied to a load and which generate very low levels of spurious RF noise and noise energy.

It is another object of the invention to provide a low noise, high-voltage-multiplication charge pump circuit and method which provide precise regulation of an output voltage supplied to a load and which generate very low levels of load-dependent noise.

It is another object of the invention to provide a low noise, high-voltage-multiplication charge pump circuit and method which provide precise regulation of an output voltage supplied to a load and which generate very low spurious RF noise levels and energy which does not rely on feedback from the output circuitry of that charge pump circuit to provide the precise regulation of the output voltage.

It is another object of the invention to provide a low noise, high-voltage-multiplication charge pump circuit and method which provide precise regulation of an output voltage supplied to a load, which generate very low levels of spurious RF noise and noise energy, and which consume relatively little power.

Briefly described, and in accordance with one embodiment, the present invention provides charge pump circuitry (1) that includes a master charge pump (2) including a voltage multiplier (5) and charge pump (30) which operate to produce a boosted, unregulated voltage (Vunreg), and also includes a slave charge pump (3) including a voltage multiplier (36) and charge pump (50) which operate to produce a boosted control voltage (Vctl) which then is filtered. The boosted, unregulated voltage (Vunreg) is regulated in response to the filtered, boosted control voltage (Vctl) to produce a boosted, regulated, low-noise voltage (Vreg). The value of the boosted control voltage (Vctl) relative to a reference voltage (Vref_SH) is controlled by feedback circuitry (61,62,65) in response to the boosted, regulated, low-noise voltage (Vreg).

In one embodiment, the invention provides charge pump circuitry (1) including master charge pump circuitry (2) which includes master voltage multiplier circuitry (5) for producing a first unregulated voltage (Mt3x) and associated first regulating circuitry (10,12,14) for regulating the first unregulated voltage (Mt3x) to produce a first regulated voltage (Mt3x_reg), and master pumping circuitry (30) for boosting the first regulated voltage (Mt3x_reg) to produce a boosted, unregulated voltage (Vunreg). The master charge pump circuitry (2) also includes slave charge pump circuitry (3) including slave voltage multiplier circuitry (36) for producing a second unregulated voltage (St3x) and associated second regulating circuitry (40,38,46) for regulating the second unregulated voltage (St3x) to produce a second regulated voltage (St3x_reg), and slave pumping circuitry (50) for boosting the second regulated voltage (St3x_reg) to produce a boosted control voltage (Vctl). A third regulating circuitry (58,56) is coupled to regulate the boosted, unregulated voltage (Vunreg) in response to the boosted control voltage (Vctl) to produce a boosted, regulated, low-noise voltage (Vreg). Feedback circuitry (61,62,65) is coupled between the boosted, regulated, low-noise voltage (Vreg) and the second regulating circuitry (40,38,46) to control regulation of the boosted control voltage (Vctl) in accordance with a predetermined reference voltage (Vref_SH).

In one embodiment, the master voltage multiplier circuitry (5) includes a voltage tripler and the master pumping circuitry (30) includes a multi-stage Dickson charge pump, and the slave voltage multiplier circuitry (36) includes a voltage tripler and the slave pumping circuitry (50) includes a multi-stage Dickson charge pump.

In one embodiment, the third regulating circuitry (58,56) includes a N-channel source-follower transistor (58) and a first low pass filter (56) coupled to a gate of the source-follower transistor (58), a drain of the source-follower transistor (58) being coupled to receive the first boosted, unregulated voltage (Vunreg), and a source of the source-follower transistor (58) being coupled to provide the boosted, regulated, low-noise voltage (Vreg). In one embodiment, the charge pump circuitry includes a second low pass filter (72) coupled to receive and filter the boosted, regulated, low-noise voltage (Vreg) to produce a boosted, regulated, low-noise bias voltage ($V_{BIAS}$).

In one embodiment, the boosted, regulated, low noise bias voltage ($V_{BIAS}$) is coupled to a variable load (75). In one embodiment, a capacitor (Cdec) receives the boosted, unregulated voltage (Vunreg) and filters ripple voltage components and transient voltage components from the boosted, unregulated voltage (Vunreg).

In one embodiment, the first regulating circuitry (10,12,14) includes a first source-follower transistor (14), a first amplifier (10), and a first transconductance amplifier (12). The drain of the first source-follower transistor (14) is coupled to the first unregulated voltage (Mt3x). A source of the first source-follower transistor (14) produces the first regulated voltage (Mt3x_reg) and also is coupled to an input of the first amplifier (10). An output of the first amplifier (10) is coupled to an input of the first transconductance amplifier (12), and an output of the first transconductance amplifier (12) is coupled to a gate of the first source-follower transistor (14). The first transconductance amplifier (12) is configured to filter the first unregulated voltage (Mt3x). In one embodiment, the second regulating circuitry (40,38,46) includes a second source-follower transistor (46), a second amplifier (40), and a second transconductance amplifier (38). A drain of the second source-follower transistor (46) is coupled to the second unregulated voltage (St3x). A source of the second source-follower transistor (46) produces the second regulated voltage (St3x_reg). An output of the second transconductance amplifier (38) is coupled to a gate of the second source-follower transistor (46). An output of the second amplifier (40) is coupled to an input of the second transconductance amplifier (38). A first input of the second amplifier (40) is coupled to receive the predetermined reference voltage (Vref_SH), and a second input of the second amplifier (40) is coupled to an output (Vfback) of the feedback circuitry (61, 62,65). The second transconductance amplifier (38) is configured to filter the second unregulated voltage (St3x). In one embodiment, the second amplifier (40) is configured as an integrating amplifier. In one embodiment, the master charge pump circuitry (2) includes a clock level shifting circuit (33) for generating a clock signal as an input to the multi-stage Dickson charge pump of the master pumping circuitry (30) to cause the amplitude of the clock signal to track the magnitude of the first regulated voltage (Mt3x_reg). The slave charge pump circuitry (3) also includes a two-stage clock level shifting circuit (49) for generating a clock signal as an input to the multi-stage Dickson charge pump of the slave pumping circuitry (50) to cause the amplitude of the clock signal to track the magnitude of the second regulated voltage (St3x_reg).

In one embodiment, the feedback circuitry (61,62,65) includes voltage divider circuitry (61,62) coupled between the boosted, regulated, low-noise voltage (Vreg) and an input of a feedback amplifier (65) to cause the boosted control voltage (Vctl) to be scaled up with reference to the predetermined reference voltage (Vref_SH). The feedback amplifier (65) may be configured as a unity gain buffer.

In one embodiment, the invention provides a method for generating a boosted, low-noise reference voltage (Vreg, $V_{BIAS}$), including producing a first unregulated voltage (Mt3x) by means of a master voltage multiplier circuit (5) and regulating the first unregulated voltage (Mt3x) to produce a first regulated voltage (Mt3x_reg); boosting the first regulated voltage (Mt3x_reg) by means of a master pumping circuit (30) to produce a boosted, unregulated voltage (Vunreg); producing a second unregulated voltage (St3x) by means of a slave voltage multiplier circuit (36) and regulating the second unregulated voltage (St3x) to produce a second regulated voltage (St3x_reg); boosting the second regulated voltage (St3x_reg) by means of a slave pumping circuit (50) to produce a boosted control voltage (Vctl); regulating the boosted, unregulated voltage (Vunreg) in response to the boosted control voltage (Vctl) to produce a boosted, regulated, low-noise voltage (Vreg); and controlling regulation of the boosted control voltage (Vctl) in accordance with a predetermined reference voltage (Vref_SH) by means of feedback circuitry (61,62,65) coupled between the boosted, regulated, low-noise voltage (Vreg) and the second regulating circuitry (40, 38,46).

In one embodiment, the method includes filtering the boosted control voltage (Vctl) by means of a low pass filter (56), and applying the filtered, boosted control voltage (Vectl_filt) to a gate of a N-channel source-follower transistor (58), wherein a drain of the source-follower transistor (58) is coupled to receive the first boosted, unregulated voltage (Vunreg), and a source of the source-follower transistor (58) is coupled to provide the boosted, regulated, low-noise voltage (Vreg).

In one embodiment, the method includes producing the boosted, unregulated voltage (Vunreg) by means of master voltage tripler circuitry (5) and master Dickson charge pumping circuitry (30) and producing the boosted control voltage (Vctl) by means of slave voltage tripler circuitry (36) and master Dickson charge pumping circuitry (30).

In one embodiment, the method includes filtering the boosted, regulated, low-noise voltage (Vreg) to produce a boosted, regulated, low-noise bias voltage ($V_{BIAS}$).

In one embodiment, the method includes scaling up the boosted control voltage (Vctl) relative to a predetermined reference voltage (Vref_SH) by means of voltage divider circuitry (61,62) coupled between the boosted, regulated, low-noise voltage (Vreg) and an input of a feedback amplifier (65).

In one embodiment, the invention provides a system (1) for generating a boosted, low-noise reference voltage (Vreg, $V_{BIAS}$), including means (5) for producing a first unregulated voltage (Mt3x) by means of a master voltage multiplier circuit and regulating the first unregulated voltage (Mt3x) to produce a first regulated voltage (Mt3x_reg); means (30) for boosting the first regulated voltage (Mt3x_reg) by means of a master pumping circuit to produce a boosted, unregulated voltage (Vunreg); means (36) for producing a second unregulated voltage (St3x) by means of a slave voltage multiplier circuit (36) and regulating the second unregulated voltage (St3x) to produce a second regulated voltage (St3x_reg); means (50) for boosting the second regulated voltage (St3x_reg) by means of a slave pumping circuit (50) to produce a boosted control voltage (Vctl); means (58) regulating the boosted, unregulated voltage (Vunreg) in response to the boosted control voltage (Vctl) to produce a boosted, regulated, low-noise voltage (Vreg); and means (61,62,65) controlling regulation of the boosted control voltage (Vctl) in accordance with a predetermined reference voltage (Vref_SH) by means of feedback circuitry coupled between the boosted, regulated, low-noise voltage (Vreg) and the second regulating circuitry (40,38,46).

DETAILED DESCRIPTION OF THE PREFERRED EMBODIMENTS

Figure 1:
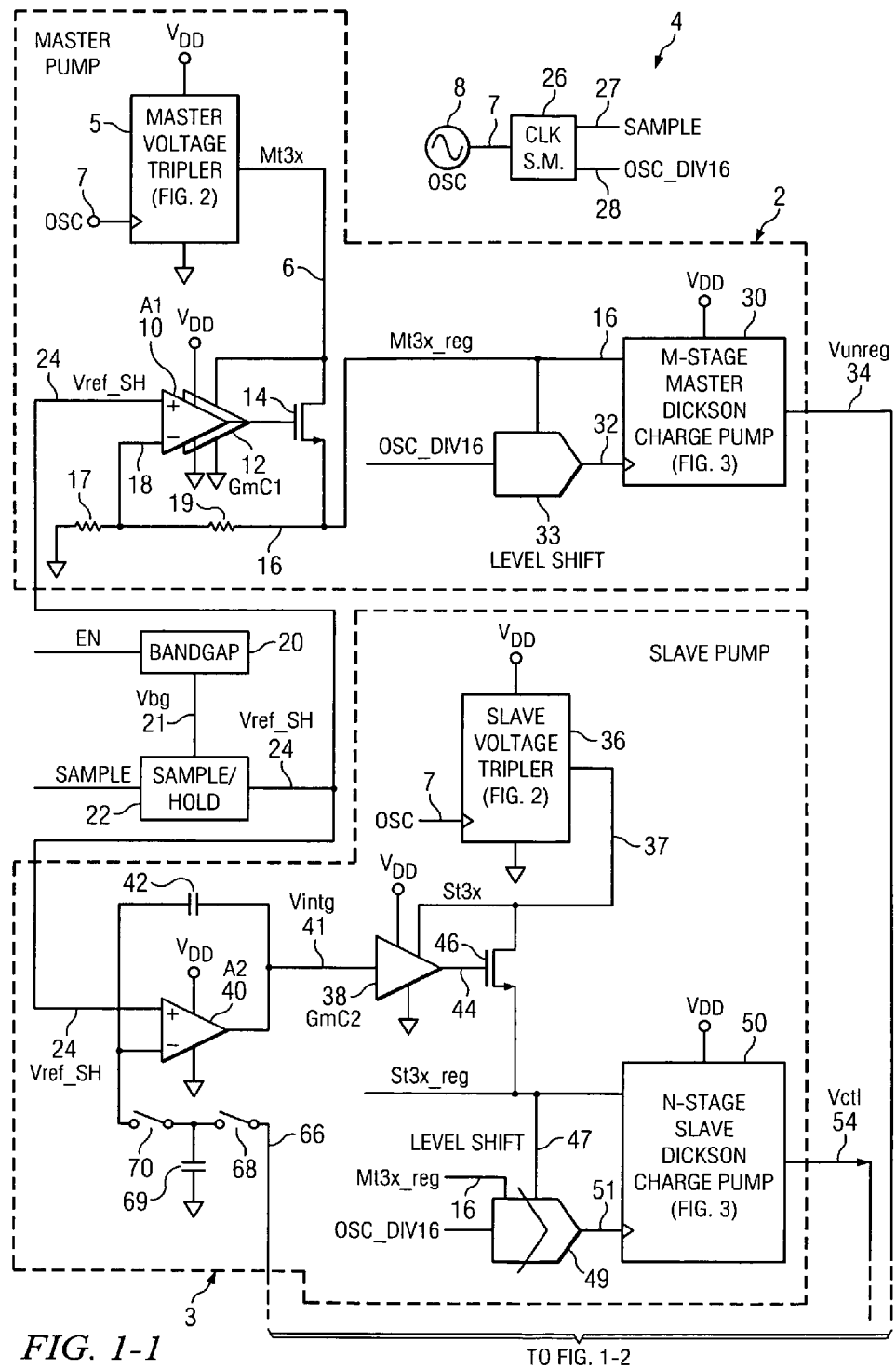
FIG. 1 is a schematic diagram of a master/slave charge pump of one embodiment of the present invention.

FIG. 1 illustrates a high voltage master/slave charge pump 1 which includes a master pump 2 which drives an external variable load and a slave pump 3 which drives a fixed internal load to regulate the output of the master pump 3. The unregulated output voltage Vunreg generated on output conductor 34 of master pump 2 is connected to the drain of a N-channel source-follower transistor 58. The source of source-follower transistor 58 is connected by conductor 60 to the input of a second order low pass filter (LPF) 72, the output 74 of which conducts a low-noise bias voltage $V_{BIAS}$ that is applied to a variable load 75. Vunreg may be subject to greater load-caused perturbations and/or noise than the output voltage Vctl produced by slave stage 3 because slave stage 3 has an essentially fixed load, rather than a variable load. The gate of source-follower transistor 58 is coupled by conductor 57 to the output of a second order LPF 56, the input of which is connected to the output 54 of slave pump 3. The source 60 of source-follower transistor 58 is also coupled to a feedback amplifier 65, the output 66 of which provides a feedback signal Vfback which controls a reference voltage input of slave pump 3.

Figures 1, 2:
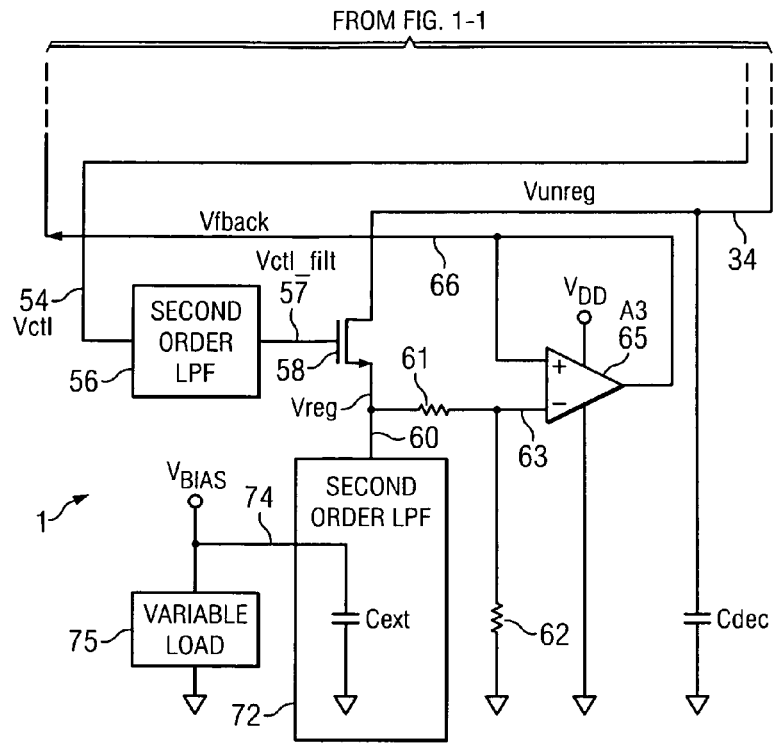
FIG. 2 is a schematic diagram of the voltage tripler circuitry used in blocks 5 and 36 in FIG. 1.

More specifically, master pump 2 includes a master voltage tripler circuit 5, details of which are shown in FIG. 2. A clock generator circuit 4 includes a conventional relaxation oscillator 8 which provides clock signal OSC on conductor 7 as an input to ordinary clock generating circuitry 26. Clock generating circuitry 26 generates a signal SAMPLE on conductor 27 and a signal OSC_DIV16 on conductor 28. Clock signal OSC_DIV16 has a frequency that may be one sixteenth the frequency of OSC. A clock input of master tripler 5 is connected to receive OSC on conductor 7.

Master tripler 5 is powered by $V_{DD}$ and is referenced to ground. Master tripler 5 generates a tripled, unregulated output signal Mt3x on conductor 6. Conductor 6 is connected to the drain of a N-channel source-follower transistor 14 and to the high-side supply voltage terminal of a transconductance amplifier 12, which performs a "GmC1" filtering function. The low-side supply voltage terminal of transconductance amplifier 12 is connected to ground. The source of source-follower transistor 14 produces a regulated voltage Mt3x_reg on conductor 16, which is connected to a first terminal of a feedback resistor divider network including resistors 19 and 17, with the second terminal of the network being connected to ground. The intermediate node 18 of the resistor divider network between resistors 19 and 17 is coupled to the (−) input of an operational amplifier 10 having a gain A1. Thus, the feedback circuitry associated with the unregulated output voltage Mt3x on master tripler 5 includes a high-gain amplifier followed by a GmC1 filter embodied in transconductance amplifier 12. The GmC1 filtering circuit is used to generate a fixed gain having voltage headroom within a few hundred millivolts of Mt3x. The GmC1 filtering is referred to ground and attenuates the output ripple voltage components in the unregulated voltage Mt3x.

The output of amplifier 10 is connected to the input of transconductance amplifier 12. The high-side supply terminal of amplifier 10 is connected to $V_{DD}$ and its low-side supply terminal is connected to ground. The (+) input of amplifier 10 receives a reference signal Vref_SH on conductor 24. The value of the fixed Mt3x_reg voltage is selected in accordance with the loading and reliability requirements of master Dickson charge pump 2. The feedback loop including amplifier 10, transconductance amplifier 12, source-follower transistor 14, and resistive voltage divider 19,17 coupled between the source of source-follower transistor 14 and the (−) input of amplifier 10 operates on the unregulated voltage Mt3x produced by a master tripler 5 on conductor 6 so as to generate the regulated voltage Mt3x_reg on conductor 16.

Vref_SH is generated by a circuit including an enabled conventional bandgap voltage circuit 20 and a sample/hold circuit 22. Bandgap voltage circuit 20 generates a bandgap voltage Vbg on conductor 21, which is connected to a reference voltage input of sample/hold circuit 22. The output of sample/hold circuit 22 is connected to conductor 24, which is applied to the (+) input of amplifier 10. The output voltage Vbg can be scaled either up or down with respect to the intrinsic bandgap voltage of circuit 20. A sample input signal SAMPLE controls when sample/hold circuit 22 samples bandgap voltage Vbg to generate Vref_SH. Bandgap voltage circuit 20 is enabled by enable signal EN.

Figure 3:
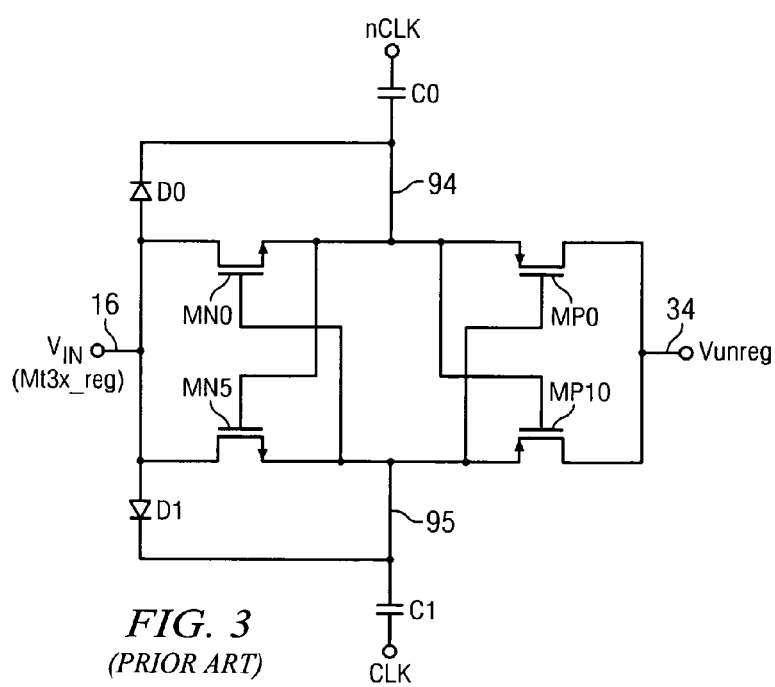
FIG. 3 is a schematic diagram of the Dickson charge pump circuitry used in blocks 30 and 50 in FIG. 1.
Figure 2:
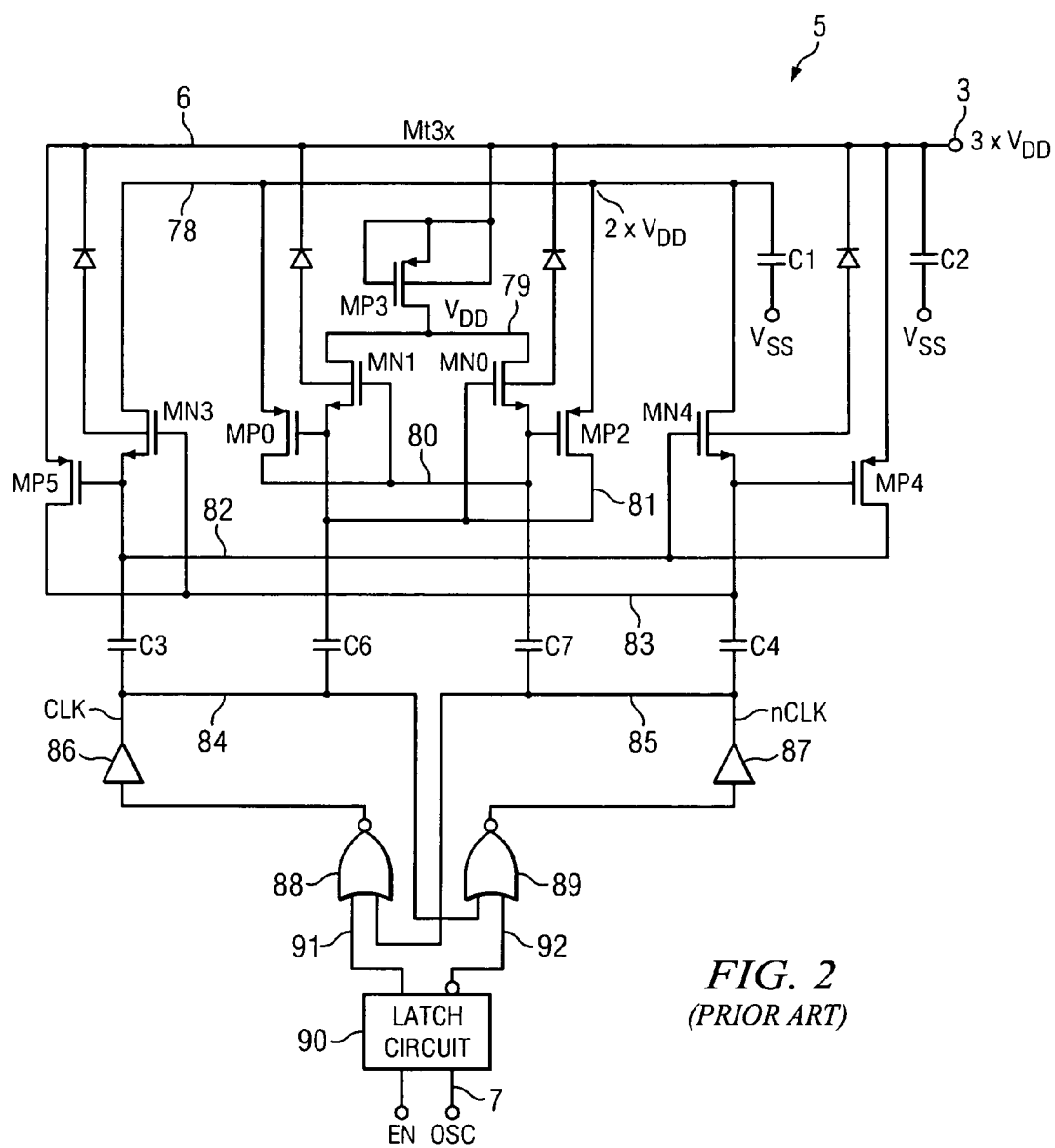

Master pump 2 also contains a M-stage (where M is an integer) Dickson charge pump circuit 30 which receives regulated output voltage Mt3x_reg on conductor 16, and also receives a level-shifted version of above-mentioned clock signal OSC_DIV 16 that is generated by level shifter 33. The level to which OSC_DIV16 is shifted on conductor 32 is controlled by St3x_reg. Details of master Dickson charge pump circuit 30 are shown in FIG. 3. The level to which OSC_DIV16 is shifted by level shifter 33 is controlled by Mt3x_reg. The output of master Dickson charge pump 30 is connected to master pump output conductor 34, on which an unregulated output voltage Vunreg is produced.

Master pump output conductor 34 is connected to one terminal of capacitor Cdec, the other terminal of which is connected to ground. Capacitor Cdec is a high voltage decoupling-storage capacitor that attenuates the output ripple voltage components in Vunreg and also functions as a storage device for receiving charge via conductor 34 from master Dickson charge pump 30 during transient events therein and also for providing charge to the drain of source-follower transistor 58. The unregulated voltage Vunreg produced by master Dickson charge pump 30 on conductor 34 is coupled to the drain of source-follower transistor 58. The source of source-follower transistor 58 produces the regulated output voltage Vreg of master pump 2 on conductor 60, which is also connected to an input of a second order LPF 72 and a terminal of a resistive voltage divider 61,62. Source-follower transistor 58 provides approximately 40 to 60 dB of ripple voltage amplitude attenuation between the unregulated signal Vunreg applied to the drain of source-follower transistor 58 and the regulated signal Vreg generated on its source.

Slave pump 3 of master/slave high-voltage charge pump 1 includes a slave tripler circuit 36, details of which are essentially the same as in master tripler circuit 5 shown in FIG. 2. A clock input of slave tripler 36 is connected to receive the clock signal OSC on conductor 7. Slave pump 3 is powered by $V_{DD}$ and is referenced to ground. Slave tripler 36 generates an unregulated output signal St3x on conductor 37, which is connected to the drain of a N-channel source-follower transistor 46 and to the high-side supply voltage terminal of a transconductance amplifier 38. The low-side supply voltage terminal of transconductance amplifier 38 is connected to ground (or $V_{SS}$). The source of source-follower transistor 46 produces a regulated voltage St3x_reg on conductor 47. Conductor 47 is connected to an input of a N-stage (where N is an integer) slave Dickson charge pump circuit 50, details of which are shown in FIG. 3.

The input of transconductance amplifier 38 is connected by conductor 41 to receive the output voltage Vintg produced by an integrator amplifier 40 and the switched capacitor circuit 68,69,70 described below. The high-side supply terminal of amplifier 40 is connected to $V_{DD}$ and its low-side supply terminal is connected to ground. The (+) input of integrator amplifier 40 receives the above-mentioned reference signal Vref_SH on conductor 24. The (−) input of integrator amplifier 40 is coupled by an integrating capacitor 42 to conductor 41, and also is connected to one terminal of a switch 70, the other terminal of which is connected to one terminal of a switch 68 and one terminal of a capacitor 69. The other terminal of switch 68 is connected to receive the feedback signal Whack on conductor 66. The other terminal of capacitor 69 is connected to ground.

A clock input of slave Dickson charge pump 50 receives a level-shifted version of OSC_DIV16 generated by a conventional level shifter 33. The level to which OSC_DIV16 is shifted on conductor 51 is controlled by Mt3x_reg. The output of slave Dickson stage 50 is connected to slave pump output conductor 54. The output voltage generated on conductor 54 by slave pump 3 is a boosted control voltage Vctl, which may be filtered by a second order LPF (low pass filter) 56 to produce a boosted, filtered, nearly ripple-free signal Vctl_filt on conductor 57. The filtered voltage Vctl_filt drives the gate of N-channel source-follower transistor 58, which has its drain connected to receive the unregulated output voltage Vunreg generated by master pump 2. The source of source-follower transistor 58 is connected to conductor 60, on which a regulated output voltage Vreg is generated.

Feedback amplifier 65 may operate as a unity gain buffer. Its high-side supply voltage terminal is connected to $V_{DD}$, and its low-side supply voltage terminal is connected to ground. The (−) input of feedback amplifier 65 is connected by conductor 63 to one terminal of a voltage divider resistor 62, the other terminal of which is connected to ground. Conductor 63 also is connected to one terminal of another voltage divider resistor 61, the other terminal of which receives the regulated voltage signal Vreg produced on conductor 60 by the operation of source-follower transistor 58, slave pump 3, and second order LPF 56. The output of amplifier 65 produces the feedback signal Vfback on feedback conductor 66, which is connected to (+) input of amplifier 65 and also to the input of the above mentioned integrator including integrator amplifier 40 and switched capacitor circuit 68,69,70.

The unregulated voltage Vunreg generated by master pump 2 is used to provide a regulated, highly boosted voltage $V_{BIAS}$ for driving a relatively large and variable load 75 (i.e., a user application) through source-follower transistor 58. Slave charge pump 3 is used to generate the highly boosted, ripple-free control voltage Vctl which drives a very small, constant load including the input capacitance of the second order LPF 56, the gate capacitance of source-follower transistor 58, and a minute amount of associated PN junction leakage current. Since slave tripler 36 only needs to be able to drive a small capacitive load and low-level reverse PN junction leakage from the high-voltage transistors coupled to the charge pumping sections of slave tripler 36 as shown in FIG. 2, the combined size of slave tripler 36 and slave Dickson charge pump 50 may be minimized, and its transient output droop characteristics between clocked pump events may be significantly mitigated.

Providing very low noise amplitude of the filtered voltage Vctl_filt applied to the gate of source-follower transistor 58 is very important to achieving a low overall ripple voltage amplitude in the regulated voltage Vreg on the source of source-follower transistor 58, because any ripple noise components of Vctl_filt are directly coupled to Vreg. The above-mentioned very light loading of slave charge pump 3 contributes substantially to achieving very low $V_{BIAS}$ output ripple voltage amplitude, which mitigates intermodulation distortion terms associated with generated mixing frequencies between the charge pump's output ripple frequency components and RF signal frequencies. Second order LPF 56 and second order LPF 72 provide even further attenuation of spurious RF noise components in $V_{BIAS}$ therefore reduce the level of mixing with the RF signals.

The physical size of slave pump 3 may be considerably smaller than the size of master pump 2 because the purpose of slave pump 3 is to drive only a small load including the gate capacitance of source-follower transistor 58 so as to control the regulated output voltage Vreg driven by master pump 2. That is, master pump 2 drives the much larger variable load 75 or user application to which $V_{BIAS}$ is applied, while slave pump 3 only drives the relatively small capacitive load of the gate of the source-follower transistor 58 along with the small levels of PN junction leakage present in the high-voltage transistors of slave pump 2.

Thus, in high-voltage master/slave charge pump 1 the slave charge pump 3 has only a very low and fixed level of loading, and is the source of the regulation of the much more heavily and variably loaded master slave charge pump 2. By design, the regulation of the reference voltage generated by slave charge pump 3 has a very low ripple voltage, and consequently the regulated voltage Vreg produced by regulating the unregulated output voltage Vunreg produced by master charge pump 2 also has very low ripple voltage content. Furthermore, this is especially true for frequency content within the standard RF bands. In contrast, the prior art uses only one charge pump both for driving the large and variable output load and for providing its own self-regulation, and therefore is not capable of having such very low ripple voltage content in the regulated output voltage supplied to the large and variable output load.

In one implementation, $V_{DD}$ may be 3 volts, and the unregulated output Mt3x on conductor 6 may be 3×VDD× (efficiency of voltage tripler 5), i.e., may be close to but less than 9 volts. The "GmC1 filtering" function of transconductance amplifier 12 uses the unregulated output voltage Mt3x to control the gate voltage of source-follower transistor 14. The output of amplifier 10 and transconductance amplifier 12 operate together to drive the gate of source-follower transistor 14. The voltage output of amplifier 10 is converted to current in the input stage of the transconductance amplifier 12 and is then reconverted back to 4 times the input voltage on the output of transconductance amplifier 12. The GmC1 filtering function of transconductance amplifier 12 filters out most of the noise from the unregulated voltage Mt3x produced by master tripler 5. The resulting voltage Mt3x_reg on conductor 16 is regulated to a fixed voltage that is designed for maximum operating efficiency of master Dickson pump 30 within its reliability limits. The unregulated voltage Vunreg produced by master Dickson charge pump 30 needs to be within a certain range that is suitably higher than the regulated voltage Vreg on conductor 60 to provide suitable voltage headroom. Also, Vreg should not exceed a maximum operating level imposed by the maximum allowable operating voltages of the various associated integrated circuit components.

Output voltage Vctl of slave pump 3 is not regulated to a fixed voltage, but is regulated according to the previously mentioned feedback control loop that controls source-follower transistor 58 so as to produce the filtered, regulated, nearly ripple-free output voltage Vreg, since Vreg closely follows the voltage Vctl_filt applied to the gate of source-follower transistor 58. The resulting regulated voltage Vreg on conductor 60 is divided by resistive voltage divider 61,62 to provide a scaled-down replica of Vreg to the (−) input of buffer amplifier 65. Vreg may be approximately 30 volts across a full specified $V_{DD}$ supply range of, for example, 2.3 volts to 3.6 volts. The feedback voltage Vfback on conductor 66 in that case may be a scaled-down representation of 30 Vref=volts as generated through the resistor divider network 61 and 62 and buffered through unity-gain buffer 65, and will be very close to the reference voltage Vref_SH of the integrator amplifier 40 of slave pump 3. The feedback voltage Vfback on conductor 66, together with the switched capacitor circuit 68,69,70, provide very low bandwidth feedback and require very little current/power consumption. The output Vintg of integrator 40 goes to the input of transconductance amplifier 38 (i.e. operates similarly to transconductance amplifier 12), which functions as a GmC2 filter. The output of transconductance amplifier 38 is connected by conductor 44 to the gate of source-follower transistor 46. The source of source-follower transistor 46 in slave pump 3 is connected to the first stage input of slave Dickson charge pump 50.

Prior Art FIG. 2 shows a voltage tripler 5 that may be utilized for implementing both master tripler 5 and slave tripler 36 in FIG. 1. Voltage tripler 5 is a slight modification of a well known basic structure for multistage voltage booster circuits, including voltage triplers. The available supply voltage $V_{DD}$ on conductor 79 is the input to a first boosting stage that includes N-channel transistors MN1 and MN0, P-channel transistors MP0 and MP2, and capacitors C6 and C7. Non-overlapping clock signals CLK and its logical complement nCLK are applied via conductors 84 and 85 to the lower terminals of capacitors C6 and C7, respectively. The upper terminal of capacitor C6 is connected by conductor 81 to the source of transistor MN1, the gate of transistor MP0, and the drain of transistor MP2. The upper terminal of capacitor C7 is connected by conductor 80 to the source of transistor MN0, the gate of transistor MP2, and the drain of transistor MP0. The drains of transistors MN1 and MN0 are connected to $V_{DD}$ input conductor 79, and the sources of transistors MP0 and MP2 are connected to conductor 78, on which a boosted voltage $2 \times V_{DD}$ is produced. A storage capacitor C1 stores the periodically replenished charge necessary to maintain the boosted voltage $2 \times V_{DD}$ on conductor 78. Latch circuit 90, NOR gates 88 and 89, and buffers 86 and 87 operate to produce the non-overlapping clock signals CLK and nCLK in response to the basic clock signal OSC generated by clock signal circuit 4 in FIG. 1. Voltage tripler 5 is an enabled circuit so that the master/slave charge pump 1 can be turned off even though the system clock OSC continues.

Similarly, the "once-boosted" voltage $2 \times V_{DD}$ on conductor 79 is the input to a second boosting stage of voltage tripler 5. The second boosting stage includes N-channel transistors MN3 and MN4, P-channel transistors MP5 and MP4, and capacitors C3 and C4. Non-overlapping clock signals CLK and nCLK are applied via conductors 84 and 85 to the lower terminals of capacitors C3 and C4, respectively. The upper terminal of capacitor C3 is connected by conductor 82 to the source of transistor MN3, the gate of transistor MP5, and the drain of transistor MP4. The upper terminal of capacitor C4 is connected by conductor 83 to the source of transistor MN4, the gate of transistor MP4, and the drain of transistor MP5. The drains of transistors MN3 and MN4 are connected to $2 \times V_{DD}$ conductor 78, and the sources of transistors MP5 and MP4 are connected to a "twice boosted" voltage tripler output conductor 6, on which a boosted voltage $3 \times V_{DD}$ is produced. A storage capacitor C2 stores the periodically replenished charge necessary to maintain the boosted voltage $3 \times V_{DD}$ on voltage tripler output conductor 6. (Note that additional similar boosting stages can be added if desired to provide additional "$V_{DD}$ level boosts" to the voltage tripler output voltage.)

The source, gate, and bulk electrodes of a diode-connected P-channel transistor MP3 are connected to output conductor 6 of voltage tripler 5. The drain of diode-connected transistor MP3 is connected to input conductor 79 of voltage tripler 5. When voltage tripler 5 is powered up, diode-connected transistor MP3 operates to provide an initial voltage on output conductor 6 equal to one diode drop below $V_{DD}$, which may be helpful in boosting the voltage on output conductor 6 toward 3×VDD.

As an example of operation of voltage tripler 5, assume transistor MN1 is off and transistor MN0 is on, as a result of the voltage on conductor 81 being high, and also assume nCLK is low and CLK is high. Also, transistor MP0 will be off. Since transistor MN0 is on, capacitor C7 will be charged to boost the voltage of conductor 80 to $V_{DD}$. Then, when nCLK goes high and CLK goes low, the voltage on conductor 80 will be boosted to $2 \times V_{DD}$ and transistor MP0 will be turned on. That will cause charge on capacitor C7 to be "pushed" through transistor MP0 so as to replenish the $2 \times V_{DD}$ on conductor 78. Operation is similar when transistor MN0 is off and transistor MN1 is on as a result of the voltage on conductor 80 being high. When CLK is low and nCLK is high, transistor MP1 will be off, and transistor MN1 will be on, so capacitor C6 will be charged to boost the voltage of conductor 81 to $V_{DD}$. Then, when CLK goes to a high level and nCK goes to a low level, the voltage of conductor 81 will be boosted to $2 \times V_{DD}$ and MP1 be turned on. That will cause charge on capacitor C6 to be "pushed" through transistor MP1 to replenish the $2 \times V_{DD}$ on conductor 78.

The operation of the above-mentioned second boosting stage including N-channel transistors MN3 and MN4, P-channel transistors MP5 and MP4, and capacitors C3 and C4 is entirely similar to the foregoing operation of the first boosting stage, except that the input to the second boosting stage is $2 \times V_{DD}$ instead of $V_{DD}$ and its output is $3 \times V_{DD}$ instead of $2 \times V_{DD}$.

FIG. 3 shows a Dickson charge pump 30 which can be used to implement master Dickson charge pump 30 and slave Dickson charge pump 50 in FIG. 1. Referring to FIG. 3, the Dickson charge pump input voltage $V_{IN}$ on conductor 16 may be either Mt3x_reg or St3x_reg in FIG. 1. Conductor 16 is connected to the anode of diode D0, the drain of N-channel transistor MN0, the anode of diode D1, and the drain of N-channel transistor MM5. The source of transistor MN0 is connected by conductor 94 to the cathode of diode D0, one terminal of pump capacitor C0, the source of P-channel transistor MP0, the gate of transistor MN5, and the gate of P-channel transistor MP10. The source of transistor MN5 is connected by conductor 95 to the cathode of diode D1, one terminal of pump capacitor C1, the source of transistor MP10, the gate of transistor MN0, and the gate of transistor MP0. The drains of transistors MP0 and MP10 are connected to conductor 34, on which Vunreg or Vctl in FIG. 1 may be produced. The other terminal of pump capacitor C0 is connected to nCLK and the other terminal of pump capacitor C1 is connected to CLK, which is 180 degrees out of phase with nCLK. As previously mentioned, the frequency of the clock signals CLK and nCLK applied to the two Dickson charge pumps 30 and 50 are one sixteenth of the frequency of the clock signals driving the two voltage triplers 5 and 36. The reason for the large difference in frequency is due to the fact there is much higher voltage increase in the Dickson charge pumps than in the voltage triplers, and this causes a heavy current load on the voltage triplers that is sustained by operating the voltage triplers at a higher frequency than the Dickson charge pumps. A suitable number of Dickson charge pumps may be cascaded to produce a higher output voltage Vunreg or Vctl.

As an example of operation of Dickson charge pump 30, assume nCLK goes to a low voltage level and CLK goes to a high voltage level. The low level of nCLK causes transistor MP10 to turn on and also causes transistor MN5 to turn off. The transition of CLK to a high level causes charge stored on capacitor C1 to flow through transistor MP10, thereby charging up or "pumping" the voltage on conductor 34 to drive the variable load 75 (FIG. 1) coupled to conductor 34. The high level of CLK turns transistor MN0 on and turns transistor MP0 off. Consequently, the input voltage on conductor 16 causes current to flow through transistor MN0 to charge capacitor C0. Similarly, when CLK goes to a low voltage level and nCLK goes to a high voltage, the low level of CLK causes transistor MP0 to turn on and also causes transistor MN0 to turn off. The transition of nCLK to a high level causes charge stored on capacitor C0 to flow through transistor MP0 and thereby charge up or pump the voltage on conductor 34 so as to drive the load connected thereto. The high level of nCLK turns transistor MN5 on and turns transistor MP10 off. Consequently, the input voltage on conductor 16 causes current to flow through transistor MN5 to charge up capacitor C1.

Slave tripler generates unregulated voltage St3x, which is then regulated to generate St3x_reg as a controlled, regulated voltage. The St3x_reg voltage level is controlled, in response to Vfback and the reference voltage Vref_SH, by the feedback loop that controls the value of Vreg. Vreg is resistively scaled down and buffered to generate Vfback. Vfback is sampled on the (−) input of switched capacitor integrator amplifier 40, which operates to control slave Dickson charge pump 3 so as to match Vfback with Vref_SH. This results in low bandwidth of integrator output voltage Vintg. Vintg is then run through the GmC2 filtering function of transconductance amplifier 38 with a fixed gain to drive the gate of source-follower transistor 46, to thereby generate the controlled, regulated voltage St3x_reg voltage coupled to the input of slave Dickson charge pumps 50 and 2 input of clock level shifter 49.

The master-slave charge pump topology shown in FIG. 1 decouples the output of master pump 2 from the much lower-noise output of slave pump 3, which then is used to control the input to the noise-sensitive gate of source-follower transistor 58. That results in very low ripple noise amplitude and low spurious noise content in the RF communication bands and also results in very little sensitivity of Vreg and $V_{BIAS}$ to large variations in variable load 75.

Master/slave charge pump 1 of FIG. 1 provides high-multiplication-factor bias voltage generation that is suitable for low power, low noise applications by generating a precisely regulated, boosted high-voltage source with very low levels of spurious RF noise and very low load-dependent variations of the boosted voltage.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. Charge pump circuitry comprising:
   (a) master charge pump circuitry including
      1) master voltage multiplier circuitry for producing a first unregulated voltage and associated first regulating circuitry for regulating the first unregulated voltage to produce a first regulated voltage, and
      2) master pumping circuitry for boosting the first regulated voltage to produce a boosted, unregulated voltage;
   (b) slave charge pump circuitry including
      1) slave voltage multiplier circuitry for producing a second unregulated voltage and associated second regulating circuitry for regulating the second unregulated voltage to produce a second regulated voltage, and
      2) slave pumping circuitry for boosting the second regulated voltage to produce a boosted control voltage;
   (c) third regulating circuitry coupled to regulate the boosted, unregulated voltage in response to the boosted control voltage to produce a boosted, regulated, low-noise voltage; and
   (d) feedback circuitry coupled between the boosted, regulated, low-noise voltage and the second regulating circuitry to control regulation of the boosted control voltage in accordance with a predetermined reference voltage.

2. The charge pump circuitry of claim 1 wherein the master voltage multiplier circuitry includes a voltage tripler and the master pumping circuitry includes a multi-stage Dickson charge pump.

3. The charge pump circuitry of claim 1 wherein the slave voltage multiplier circuitry includes a voltage tripler and the slave pumping circuitry includes a multi-stage Dickson charge pump.

4. The charge pump circuitry of claim 1 wherein the third regulating circuitry includes a N-channel source-follower transistor and a first low pass filter coupled to a gate of the source-follower transistor, a drain of the source-follower transistor being coupled to receive the first boosted, unregulated voltage, and a source of the source-follower transistor being coupled to provide the boosted, regulated, low-noise voltage.

5. The charge pump circuitry of claim 4 including a second low pass filter coupled to receive and filter the boosted, regulated, low-noise voltage to produce a boosted, regulated, low-noise bias voltage.

6. The charge pump circuitry of claim 5 wherein the boosted, regulated, low noise bias voltage is coupled to a variable load.

7. The charge pump circuitry of claim 1 including a capacitor receiving the boosted, unregulated voltage and filtering ripple voltage components and transient voltage components from the boosted, unregulated voltage.

8. The charge pump circuitry of claim 1 wherein the first regulating circuitry includes a first source-follower transistor, a first amplifier, and a first transconductance amplifier, a drain of the first source-follower transistor being coupled to the first unregulated voltage, a source of the first source-follower transistor producing the first regulated voltage, the source of the first source-follower transistor also being coupled to an input of the first amplifier, an output of the first amplifier being coupled to an input of the first transconductance amplifier, and an output of the first transconductance amplifier being coupled to a gate of the first source-follower transistor, the first transconductance amplifier being configured to filter the first unregulated voltage.

9. The charge pump circuitry of claim 1 wherein the second regulating circuitry includes a second source-follower transistor, a second amplifier, and a second transconductance amplifier, a drain of the second source-follower transistor being coupled to the second unregulated voltage, a source of the second source-follower transistor producing the second regulated voltage, an output of the second transconductance amplifier being coupled to a gate of the second source-follower transistor, an output of the second amplifier being coupled to an input of the second transconductance amplifier, a first input of the second amplifier being coupled to receive the predetermined reference voltage, a second input of the second amplifier being coupled to an output of the feedback circuitry, the second transconductance amplifier being configured to filter the second unregulated voltage.

10. The charge pump circuitry of claim 9 wherein the second amplifier is configured as an integrating amplifier.

11. The charge pump circuitry of claim 2 wherein the master charge pump circuitry includes a clock level shifting circuit for generating a clock signal as an input to the multi-stage Dickson charge pump of the master pumping circuitry to cause the amplitude of the clock signal to track the magnitude of the first regulated voltage.

12. The charge pump circuitry of claim 3 wherein the slave charge pump circuitry includes a clock level shifting circuit for generating a clock signal as an input to the multi-stage Dickson charge pump of the slave pumping circuitry to cause the amplitude of the clock signal to track the magnitude of the second regulated voltage.

13. The charge pump circuitry of claim 1 wherein the feedback circuitry includes voltage divider circuitry coupled between the boosted, regulated, low-noise voltage and an input of a feedback amplifier to cause the boosted control voltage to be scaled up with reference to the predetermined reference voltage.

14. The charge pump circuitry of claim 13 wherein the feedback amplifier is configured as a unity gain buffer.

15. A method for generating a boosted, low-noise reference voltage, the method comprising:
  (a) producing a first unregulated voltage by means of a master voltage multiplier circuit and regulating the first unregulated voltage to produce a first regulated voltage;
  (b) boosting the first regulated voltage by means of a master pumping circuit to produce a boosted, unregulated voltage;
  (c) producing a second unregulated voltage by means of a slave voltage multiplier circuit and regulating the second unregulated voltage to produce a second regulated voltage;
  (d) boosting the second regulated voltage by means of a slave pumping circuit to produce a boosted control voltage;
  (e) regulating the boosted, unregulated voltage in response to the boosted control voltage to produce a boosted, regulated, low-noise voltage; and
  (f) controlling regulation of the boosted control voltage in accordance with a predetermined reference voltage by means of feedback circuitry coupled between the boosted, regulated, low-noise voltage and the second regulating circuitry.

16. The method of claim 15 including filtering the boosted control voltage by means of a low pass filter, and applying the filtered, boosted control voltage to a gate of a N-channel source-follower transistor, a drain of the source-follower transistor being coupled to receive the first boosted, unregulated voltage, and a source of the source-follower transistor being coupled to provide the boosted, regulated, low-noise voltage.

17. The method of claim 15 including producing the boosted, unregulated voltage by means of master voltage tripler circuitry and master Dickson charge pumping circuitry and producing the boosted control voltage by means of slave voltage tripler circuitry and master Dickson charge pumping circuitry.

18. The method of claim 16 including filtering the boosted, regulated, low-noise voltage to produce a boosted, regulated, low-noise bias voltage.

19. The method of claim 15 including scaling up the boosted control voltage relative to a predetermined reference voltage by means of voltage divider circuitry coupled between the boosted, regulated, low-noise voltage and an input of a feedback amplifier.

20. A system for generating a boosted, low-noise reference voltage, comprising:
  (a) means for producing a first unregulated voltage by means of a master voltage multiplier circuit and regulating the first unregulated voltage to produce a first regulated voltage;
  (b) means for boosting the first regulated voltage by means of a master pumping circuit to produce a boosted, unregulated voltage;
  (c) means for producing a second unregulated voltage by means of a slave voltage multiplier circuit and regulating the second unregulated voltage to produce a second regulated voltage;
  (d) means for boosting the second regulated voltage by means of a slave pumping circuit to produce a boosted control voltage;
  (e) means regulating the boosted, unregulated voltage in response to the boosted control voltage to produce a boosted, regulated, low-noise voltage; and
  (f) means controlling regulation of the boosted control voltage in accordance with a predetermined reference voltage by means of feedback circuitry coupled between the boosted, regulated, low-noise voltage and the second regulating circuitry.

* * * * *